(12) United States Patent
Yamada

(10) Patent No.: US 11,231,886 B2
(45) Date of Patent: Jan. 25, 2022

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/747,941

(22) Filed: Jan. 21, 2020

(65) Prior Publication Data

US 2020/0249882 A1 Aug. 6, 2020

(30) Foreign Application Priority Data

Feb. 1, 2019 (JP) .............................. JP2019-017443

(51) Int. Cl.
 *G06F 15/00* (2006.01)
 *G06F 3/12* (2006.01)
(52) U.S. Cl.
 CPC ............ *G06F 3/1206* (2013.01); *G06F 3/123* (2013.01)
(58) Field of Classification Search
 CPC ............................... G06F 3/1206; G06F 3/123
 USPC ....................................................... 358/1.15
 See application file for complete search history.

(56) References Cited

U.S. PATENT DOCUMENTS

| 6,788,428 B1* | 9/2004 | Shimokawa .......... G06F 3/1205 |
| | | 358/1.13 |
| 2006/0114487 A1* | 6/2006 | Caveney, Jr. ......... G06F 3/1285 |
| | | 358/1.13 |
| 2013/0063742 A1 | 3/2013 | Kikuchi |
| 2017/0223210 A1 | 8/2017 | Yamada |
| 2018/0267750 A1 | 9/2018 | Kobayashi |

FOREIGN PATENT DOCUMENTS

| JP | 2013-058090 A | 3/2013 |
| JP | 2015-041268 A | 3/2015 |
| JP | 2017-134718 A | 8/2017 |
| JP | 2018-156636 A | 10/2018 |

OTHER PUBLICATIONS

International Search Report and the Written Opinion dated Mar. 10, 2020 of the International Searching Authority issued in the PCT application No. PCT/JP2020/002921 together with English language translation.

* cited by examiner

*Primary Examiner* — Mark R Milia
(74) *Attorney, Agent, or Firm* — Scully, Scott, Murphy & Presser, PC

(57) ABSTRACT

An editing application implemented in a PC obtains image data and print parameter and transmits, to a supporting program, a processing request of processing the image data based on the print parameter. The supporting program is implemented in the PC, and is activated also when a printing instruction to a general-use printing program implemented in an OS is inputted. The supporting program processes the image data in accordance with the processing request. The editing application obtains the processed image data and causes the PC to display the same through an UI.

11 Claims, 10 Drawing Sheets

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application claims priority under 35 U.S.C. § 119 from Japanese Patent Application No. 2019-017443 filed on Feb. 1, 2019. The entire subject matter of the application is incorporated herein by reference.

BACKGROUND

Technical Field

The technical field disclosed in the present specification relates to a non-transitory computer-readable recording medium containing instructions realizing an application program which outputs a print command to cause a printer to execute printing, a non-transitory computer-readable recording medium containing instructions realizing a supporting program which supports control of a printer, an information processing apparatus and a printing method.

Related Art

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, the OS associates a printer with the OS-standard general-use printing program. Thereafter, it becomes possible that, when the OS receives a print instruction corresponding to the printer, printing is executed using the OS-standard general-use printing program, without using the printer driver.

Even in the printing using the above-mentioned OS-standard general-use printing program, as with the printer driver, it is desirable that a processing function for generating print data in which processes such as a magnification/reduction process and a combining process are applied to an image is supported. If the general-use printing program supports such processing function, there is a possibility that processes that are not intended by the user are applied to the print data due to setting mistake by the user or the like. In this case, even if print data to which such processes are applied is transmitted to a printer, a print product that the user desires will not be output and expendable supplies will be wastefully consumed.

According to aspects of the present disclosure, there is provided a non-transitory computer-readable recording medium for an information processing apparatus, the information processing apparatus having a controller, the information processing apparatus being connected to a printer, the recording medium containing computer-executable instructions realizing an application program configured to output a printing instruction to cause the printer to execute printing. The application program, as executed by the controller, causes the information processing apparatus to perform an image data obtaining process of obtaining image data, when a print instruction to instruct the printer to execute printing an image indicated by the image data obtained in the image data obtaining process is received, a print instruction inputting process of inputting, to a general-use printing program, notification indicating that the print instruction is received, the general-use printing program being a program implemented in an operating system of the information processing apparatus in advance, a processing setting obtaining process of obtaining processing setting used for processing by the processing function of a supporting program corresponding to the printer, the supporting program being a program implemented in the information processing apparatus, the supporting program having a processing function of applying processing to an image, when receiving displaying instruction to display an image to be printed by the printer, executing an output instructing process of causing the general-use printing program to output one of the intermediate image data and the print data based on the image data obtained in the image data obtaining process, the general-use printing program activating the supporting program when the notification indicating that the print instruction is received is input, the supporting program generating processed image data by applying the processing using the processing function to one of intermediate image data and print data which are output from the general-use printing program in accordance with the output instructing process, the general-use printing program causing the printer to execute printing of an image indicated by the processed image data provided from the supporting program, a processing requesting process of inputting, to the supporting program, a processing request to execute processing based on one of the generated intermediate image data and the generated print and based on the processing setting obtained in the processing setting obtaining process, the supporting program generating processed image data by applying processing by the processing function to image data obtained in the image data obtaining process when receiving the processing request, and a preview displaying process of obtaining, from the supporting program, the processed image data generate by the supporting program based on the processing request input in the processing requesting process, and causing a display of the information processing apparatus to display an image indicated by the processed image data.

BRIEF DESCRIPTION OF THE ACCOMPANYING DRAWINGS

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
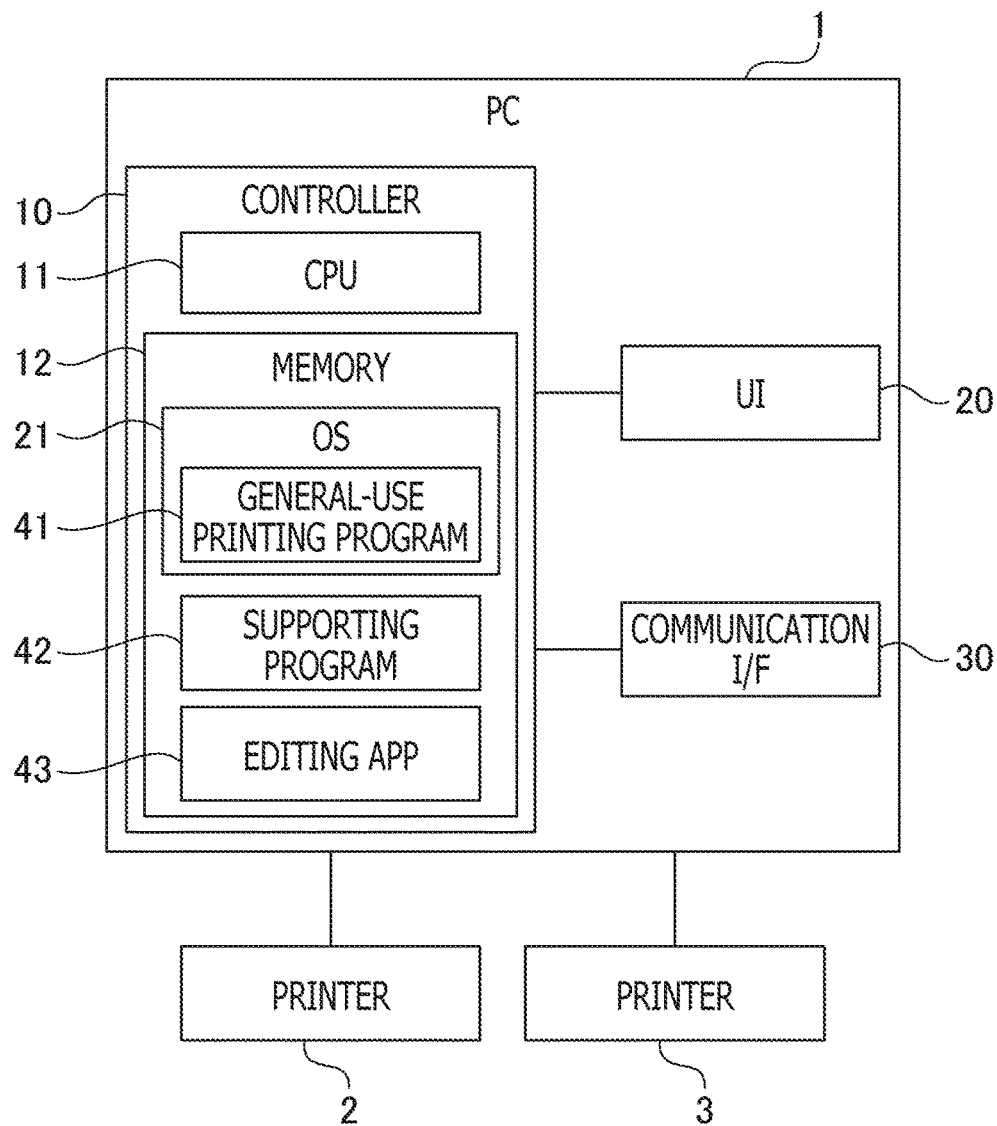
FIG. 1 is a block diagram showing an electrical configuration of a print system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard general-use printing program which is implemented in the OS 21 in advance. The general-use printing program 41 according to the present embodiment is configured to, when receiving print execution notification from the editing APP 43, generate print data the printer can use for printing based on image data, which is attached to the print execution notification, subjected to be printed.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with operations of the general-use printing program 41 and is an APP which supports controlling of hardware subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, the editing APP 43 is configured to receive, through the UI 20, a print instruction which causes the printer 2 to execute printing.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Figure 2:
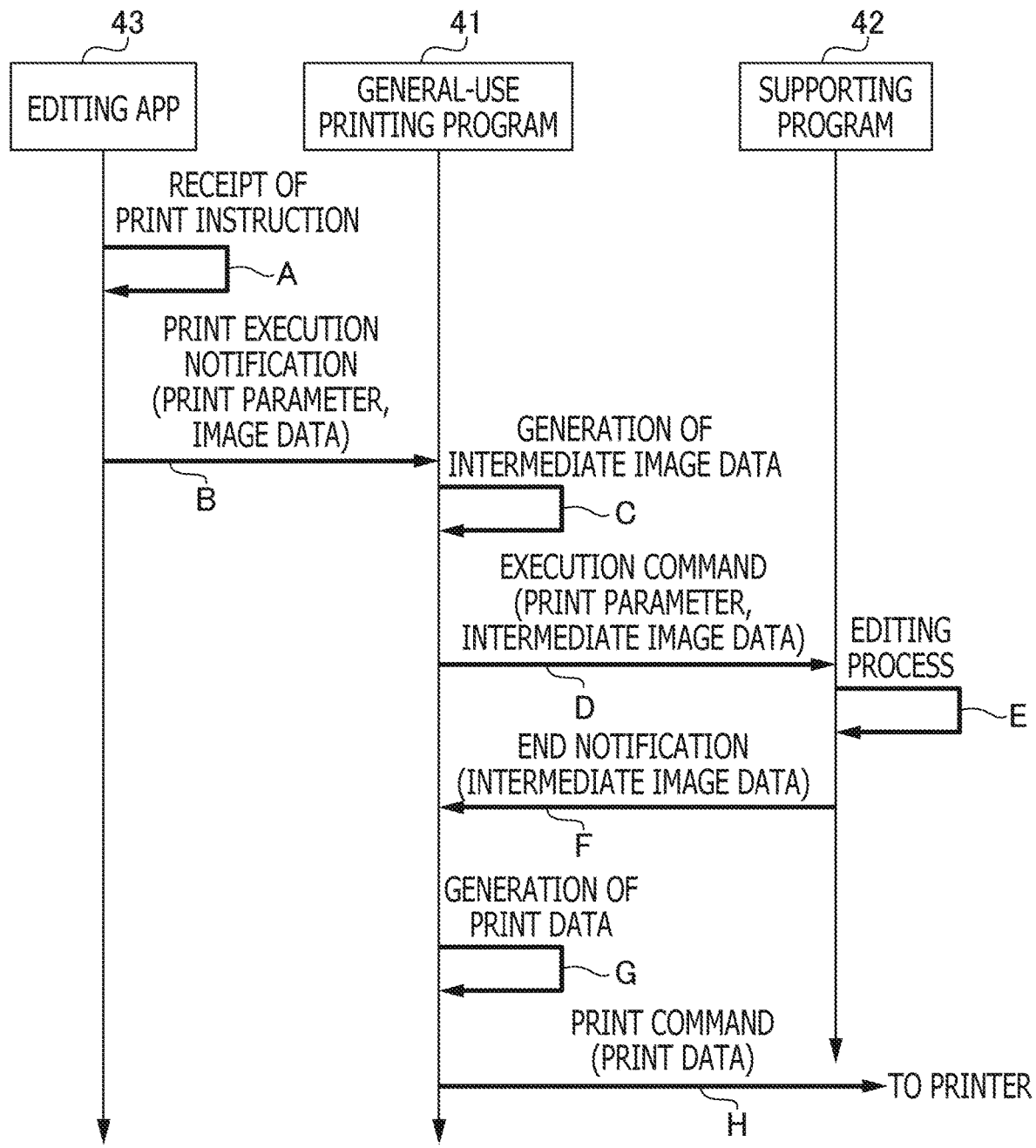
FIG. 2 is a sequential chart showing an example of an order of operations realized by respective programs.

Next, a configuration of the supporting program 42 and a printing procedure including processes based on the supporting programs 42 of the present embodiment will be generally described with reference to a sequential chart shown in FIG. 2. The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the image. Then, the editing APP 43 which received the print instruction delivers a print execution notification indicating contents of received print instruction to the OS 21. It is noted that, in FIG. 2, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, information indicating print parameters set with the APP, information indicating image data subjected to be printed, and information for identifying a user who instructed to execute printing. It is noted that, as will be described later, these pieces of information are used in the supporting program 42 as well. It is noted that the process at arrow B is an example of a print instruction inputting process.

The general-use printing program 41 generates intermediate image data by converting a format of the image data included in the print execution notification to a format of the intermediate image data and generates a print job including the intermediate image data (arrow C). There are various types of image data as the image data included in the editing APP 43, and the general-use printing program 41 converts received image data to an intermediate image data suitable for the generation of the print data. It is noted that, if the image data included in the print execution notification is suitable for the generation of the print data, the generation of the intermediate image data may be omitted and the print data may be directly used as the intermediate image data. The intermediate image data is, for example, XPS format data.

Further, the general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, prior to starting generation of the print data, the general-use printing program 41 can activate the supporting program 42 by outputting an execution command for causing the supporting program 42 to execute processes. In this case, the execution command to the supporting program 42 is output from the general-use printing program 41.

In the present embodiment, the supporting program 42 executes processes for editing an image of the intermediate image data. Specifically, an execution command of an editing process is output from the general-use printing program 41 to the supporting program 42 (arrow D), and the supporting program 42 obtains the print parameters and the intermediate image data from the general-use printing program 41 and applies, to the image of the intermediate image data, processes in accordance with settings of the print parameters (arrow E). This processed intermediate image data to which the processes in accordance with the settings of the print parameters are applied is an example of a "processed image data". For example, the image processing includes aggregation of images, division of an image, magnification/reduction of an image, combining of an image such as a watermark and the like. When terminating each process, the supporting program 42 transmits an end notification to the general-use printing program 41.

Then, the supporting program 42 returns an end notification indicating the end of the editing process to the general-use printing program 41 and terminates the process (arrow F). The supporting program 42 provides the intermediate image data after the editing process to the general-use printing program 41.

In the present embodiment, after the generation of the intermediate image data, the general-use printing program 41 activates the supporting program 42 as necessary and then generates the print data based on the intermediate image data (arrow G). The print data generated by the general-use printing program 41 is print data of a format that can be used in printing with various types of printers. The print data is, for example, PWG Raster data or PDF data.

After the generation of the print data, the general-use printing program 41 transmits a print command to the printer 2 (arrow H). Then, the printer 2 which received the print command executes printing of the image in accordance with the print data attached to the print command. When the printer 2 receives print data to which the command is attached, the printer 2 performs operations indicated by the command when executing printing.

It is noted that the supporting program 42 may execute a print data editing process. In this case, for example, as the print data editing process, the supporting program 42 adds, to the print data, commands for causing the printer 2 to execute functions unique to the printer 2. The functions unique to the printer 2 include, for example, a toner save function and a finisher function. If the printer 2 has functions of adding watermarks, header/footer and the like to an image by itself, in the print data editing process, the supporting program 42 may add, to the print data, commands for causing the printer 2 to execute these functions. In case the supporting program 42 transmits the print data to the printer 2 without using the general-use printing program 41 as will be described later, the supporting program 42 may convert the print data to a data of a format different from the format of the print data, which the general-use printing program 41 generates, and may transmit the converted print data to the printer 2.

For example, the editing APP 43 is provided by the same vender as the supporting program 42 and is adapted to a type of the printer 2. The editing APP 43 causes the UI 20 to display a setting screen and receives settings of the print parameters.

It is noted that, as the print parameters, there are general-use parameters that are used in the generation of print data by the general-use printing program 41 and intrinsic parameters that are not used in the generation of print data by the general-use printing program 41. The general-use parameters are, for example, parameters for setting a sheet size, a printing resolution and color/monochromatic printing. The intrinsic parameters are, for example, parameters for setting sheet tray designation, both-side/single-side printing, aggregation printing and addition of watermarks. The supporting program 42 can receive both editing setting of the general-use parameters and editing setting of the intrinsic parameters through the setting screen concerning the print parameters. However, a commonly used editing APP receives the editing setting of the general-use parameters but often do not receive the editing setting of the intrinsic parameter. However, since the editing APP 43 is provided by the same vender as the supporting program 42 and is adapted to the printer 2, as with the supporting program 42, the editing APP 43 can receive both the editing setting of the general-use parameters and the editing setting of the intrinsic parameters.

The general-use parameters are parameters that can be mutually exchanged between the editing APP 43, the general-use printing program 41 and the supporting program 42.

On the other hand, the intrinsic parameters are parameters that cannot be mutually exchanged between the general-use printing program 41 and the supporting program 42 and between the editing APP 43 and the general-use printing program 41. The editing APP 43 stores the intrinsic parameters in a storage area for the editing APP 43 in the memory 12 and edits and reads out the intrinsic parameters without using the general-use printing program 41. The storage area for the editing APP 43 may be, for example, a registry prepared by the OS 21. It is noted that, if the general-use printing program 41 can handle the intrinsic parameters as well, the supporting program 42 may receive the intrinsic parameters through the general-use printing program 41.

The supporting program 42 includes a plurality of interfaces for transmitting and receiving signals. For example, the interfaces may be provided for respective processes the supporting program 42 can execute or may be provided for respective signal types.

In the present embodiment, the supporting program 42 includes a first interface configured to receive execution commands output from the editing APP 43, and a second interface configured to receive execution commands output from the general-use printing program 41. When the execution command of the editing process of intermediate image data is received from the editing APP 43 through the first interface, the supporting program 42 processes the intermediate image data based on the print parameters and sends the processed intermediate image data to the editing APP 43. On the other hand, when the execution command of the editing process of intermediate image data is received from the editing APP 43 through the second interface, the supporting program 42 processes the intermediate image data based on the print parameters and sends the processed intermediate image data to the general-use printing program 41.

The editing APP 43 of the present embodiment has a print preview function. Hereinafter, processes for the editing APP 43 activating the print preview function will be described with reference to the sequential chart shown in FIG. 3. It is noted that, in FIG. 3, processes corresponding to those in FIG. 2 are assigned the same numerals as in FIG. 2.

Figure 3A:
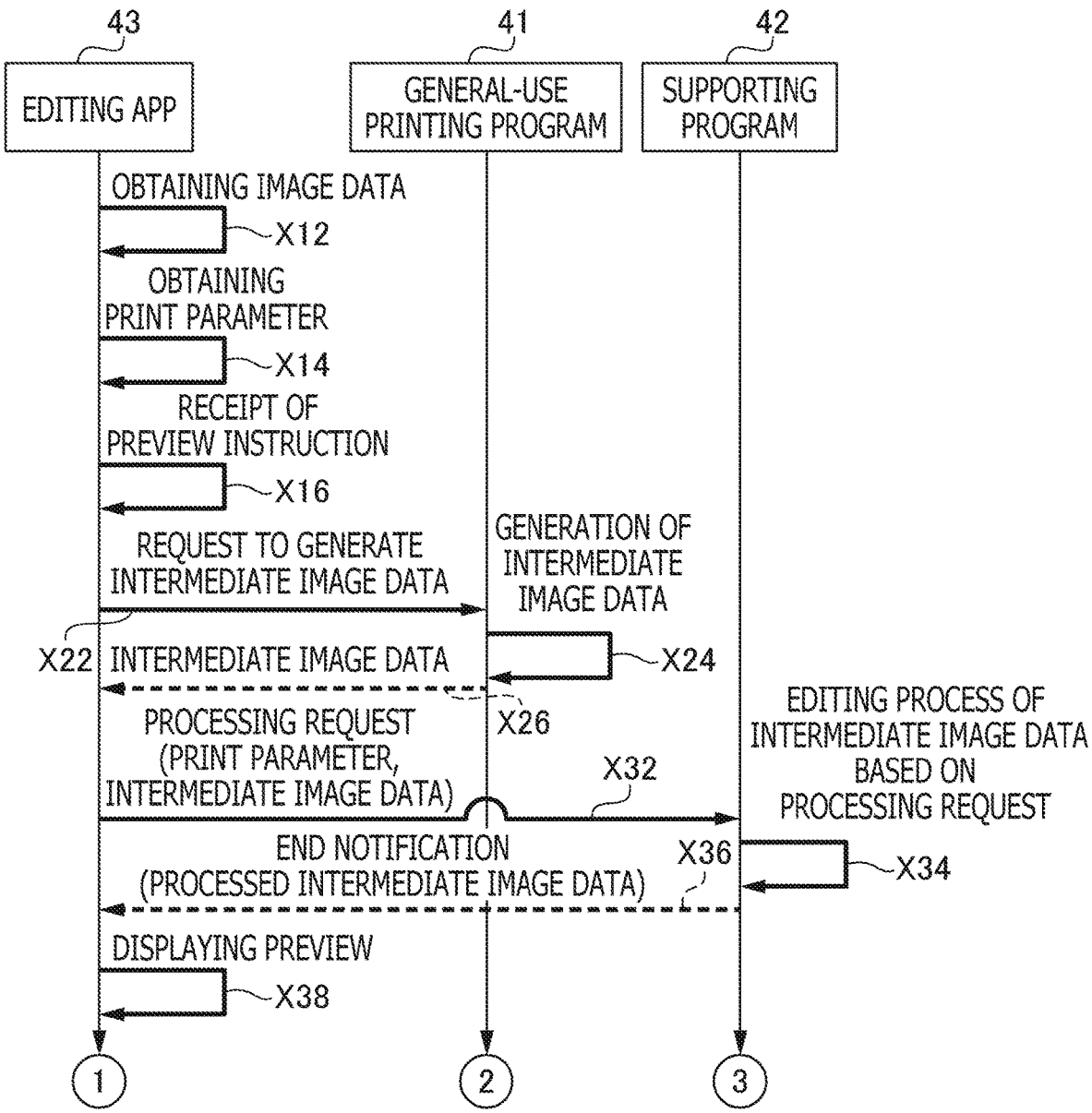
FIGS. 3A and 3B are sequential charts showing an example of a preview operation realized by an editing application.
Figure 3B:
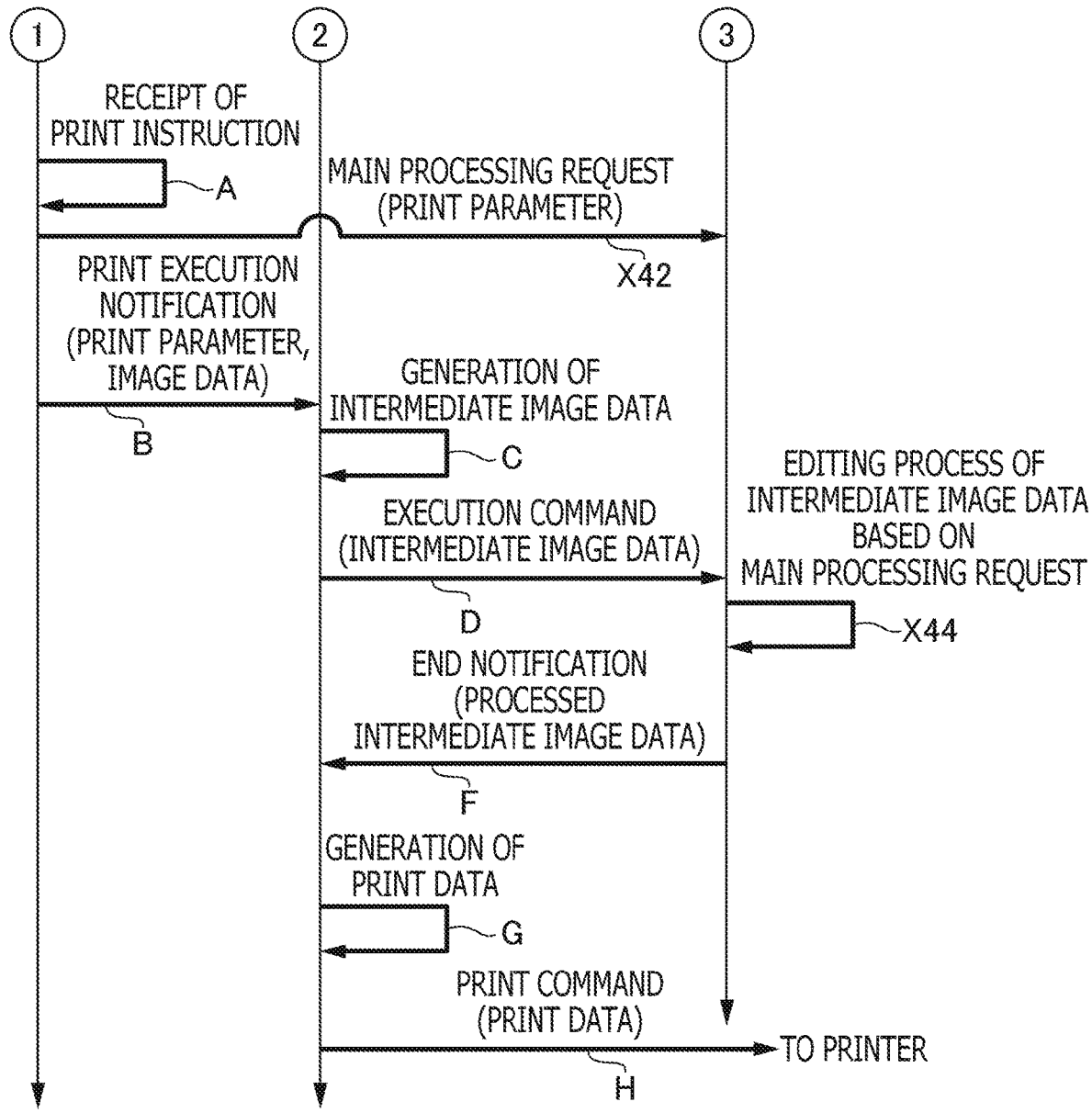

As shown in FIG. 3, the editing APP 43 for example obtains image data (arrow X12) and obtains print parameters (arrow X14). The process at the arrow X12 and the process at the arrow X14 may be executed in inverse order. The process at the arrow X12 is an example of an "image data obtaining process". The process at the arrow X14 is an example of a "processing setting obtaining process". The print parameters obtained by the process at the arrow X14 is an example of a "processing setting". The editing APP 43 for example obtains the print parameters through the print parameter setting screen. The print parameter setting screen is a screen configured to receive settings concerning both the general-use parameters and the intrinsic parameters. The editing APP 43 stores the intrinsic parameters received through the print parameter setting screen, in order to use them in later processes by the supporting program 42, in a storage area of the memory 12 shared by the editing APP 43 and the supporting program 42. Further, the editing APP 43 may store the general-use parameters received through the print parameter setting screen in the storage area of the memory 12 shared by the editing APP 43 and the supporting program 42.

Figure 4:
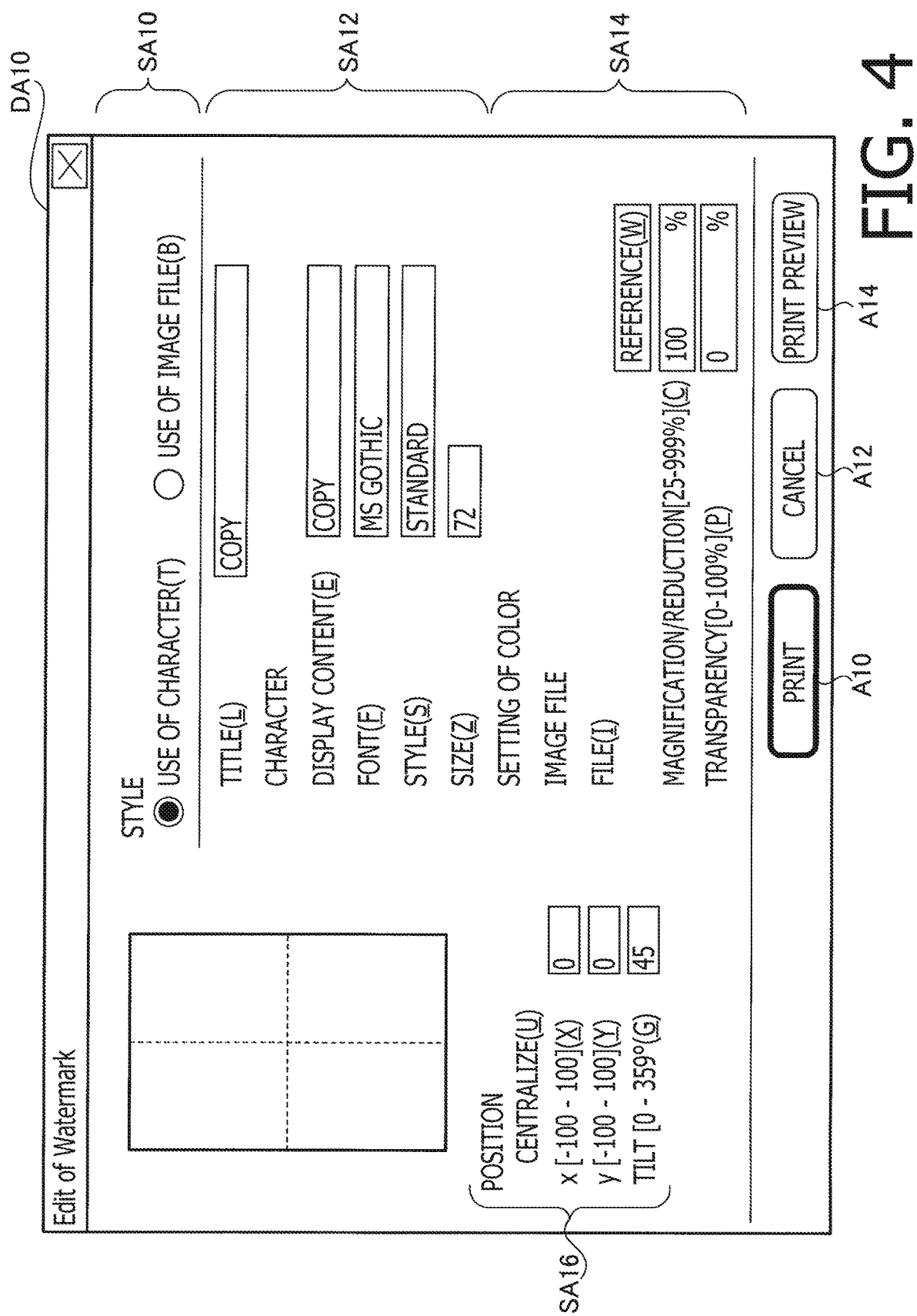
FIG. 4 illustrates an example of a watermark setting screen.

An example of the print parameter setting screen for setting the print parameters will be described with reference to FIG. 4. FIG. 4 is a watermark setting screen DA10 for performing settings concerning a watermark to be combined with an image of the intermediate image data. For example, the watermark setting screen DA10 is a dialog which is displayed when adding of a watermark is selected, from a print setting screen of the editing APP 43, as the function unique to the printer 2. The watermark setting screen DA10 includes, for example, a style selecting area SA10, a character setting area SA12, an image file setting area SA14 and a position setting area SA16.

The style selecting area SA10 is an area for selecting whether to use characters or image files as the watermark. The character setting area SA12 is an area for performing various settings on characters in case characters are selected in the style selecting area SA10. The various settings on characters include, for example, settings of contents to be displayed, font, style, size and color. The image file setting area SA14 is an area for performing various settings on image files in case image files are selected in the style selecting area SA10. The various settings on image files include, for example, storing location of an image file, image magnification/reduction ratio, transparency and the like. The position setting area SA16 is an area for setting a printing position of the watermark.

The watermark setting screen DA10 is provided with a PRINT button A10, a CANCEL button A12 and a PRINT PREVIEW button A14. The PRINT button A10 is an operation button for receiving a print instruction instructing to execute printing based on the print parameters set in the editing APP 43. The CANCEL button A12 is an operation button for receiving an instruction to abort setting of watermark. The PRINT PREVIEW button A14 is an operation button for receiving a preview instruction for causing the UI 20 to display the intermediate image data processed in accordance with the print parameters set through the print parameter setting screen.

Referring back to FIG. 3, when the PRINT PREVIEW button A14 is pressed and the preview instruction is received (arrow X16), the editing APP 43 requests the general-use printing program 41 to generate the intermediate image data (arrow X22). At this time, the editing APP 43 attaches, to the request, the image data obtained in the process at the arrow X12. Further, the editing APP 43 attaches, among the print parameters obtained in the process at the arrow X14, only the general-use parameters to the request. To the request, a flag indicating that the request is not for requesting to generate intermediate image data for printing or a flag indicating that the request is for requesting to generate an intermediate image data for displaying a preview may be attached.

In response to receiving the request, the general-use printing program 41 converts the image data to the intermediate image data based on the print parameters (arrow X24) and returns the intermediate image data to the editing APP 43 (arrow X26). The general-use printing program 41 can handle the general-use parameters but cannot handle the intrinsic parameters. Therefore, the general-use printing program 41 processes the image data using the general-use parameters attached to the request and generates the intermediate image data. Accordingly, processes by the functions unique to the printer 2 such as adding of the watermark are not reflected to the intermediate image data output from the general-use printing program 41 to the editing APP 43. A format of the intermediate image data output to the editing APP 43 is the same as a format of the intermediate image data the general-use printing program 41 outputs to the supporting program 42 in response to receiving the print execution notification from the editing APP 43.

Upon receiving the intermediate image data from the general-use printing program 41, the editing APP 43 inputs the execution command of the editing process directly to the supporting program 42 through the first interface (arrow X32). That is, the editing APP 43 requests the supporting program 42 to execute the process of processing the intermediate image data for displaying the preview. To the execution command, a flag indicating that the execution command is not a command to execute the editing process of processing the intermediate image data for printing or a flag indicating that the execution command is a command to execute the editing process of processing the intermediate image data for displaying the preview may be attached. In the following description, the execution command input by the editing APP 43 as described above will also be referred to as a "processing request". To the processing request, the intermediate image data output from the general-use printing program 41 to the editing APP 43 and the print parameter obtained at the arrow X14 are attached. The process at the arrow X32 is an example of a "process requesting process". Since the intermediate image data is generated by the general-use printing program 41, the supporting program 42 can receive the intermediate image data from the editing APP 43 in the same format as the intermediate image data to be received from the general-use printing program 41 when executing printing.

Upon receiving the processing request through the first interface, the supporting program 42 edits the intermediate image data attached to the processing request based on the print parameters attached to the processing request (arrow X34). The print parameters to be used in this case include the intrinsic parameters. Therefore, the supporting program 42 can process the intermediate image data based on the intrinsic parameters. For example, if the print parameters set on the watermark setting screen DA10 shown in FIG. 4 are attached to the execution command, the supporting program 42 combines a watermark to the image of the intermediate image data in accordance with the print parameters. In the present embodiment, in case the execution command of the editing process is received through the first interface, the supporting program 42 executes processes similar to those in case the execution command of the editing process is received through the second interface.

It is noted that, if the editing APP 43 has stored the intrinsic parameters obtained in the process at the arrow X14 in the storage area of the memory 12 shared by the editing APP 43 and the supporting program 42, the editing APP 43 may deliver the intrinsic parameters to the supporting program 42 through the sharing storage area. That is, the editing APP 43 may deliver, to the supporting program 42, the processing request which does not include the intrinsic parameters, and the supporting program 42 may read out the intrinsic parameters from the storage area shared by the editing APP 43 and the supporting program 42 and process the intermediate image data using the intrinsic parameter.

Among the general-use parameters, there are parameters that are necessary when the supporting program 42 processes the intermediate image data. Therefore, in the process at the arrow X32, the editing APP 43 may attach both the general-use parameters and the intrinsic parameters to the processing request. In this case, in the process at the arrow X34, the supporting program 42 processes the intermediate image data using both the general-use parameters and the intrinsic parameters received in the process at the arrow X32.

In case the editing APP 43 causes the supporting program 42 to generate the intermediate image data for displaying the preview, quality of the intermediate image data for displaying the preview may be made lower than that of the intermediate image data for printing.

For example, if the editing APP 43 has attached, to the processing request, the flag indicating that the execution command is not a command to execute the editing process of processing the intermediate image data for printing or the flag indicating that the execution command is a command to execute the editing process of processing the intermediate image data for displaying the preview, the supporting program 42 may generate, in the process at the arrow X34, the intermediate image data of which the quality is slightly lower than the intermediate image data for printing but of which processing load is low. For example, the supporting program 42 may generate the intermediate image data for displaying the preview in a resolution lower than a printing resolution being set in the general-use parameters.

Further, for example, in the process at the arrow X22, the editing APP 43 may deliver, to the general-use printing program 41, a print parameter indicating quality slightly lower than quality set by the print parameters obtained in the process at the arrow X14. Then, in the process at the arrow X32, the editing APP 43 may deliver, to the supporting program 42, the print parameter indicating the quality slightly lower than the quality set by the print parameters obtained in the process at the arrow X14.

After processing the intermediate image data, the supporting program 42 transmits an end notification to which the processed intermediate image data is attached to the editing APP 43 (arrow X36). Upon receiving the processed intermediate image data processed by the supporting program 42, the editing APP 43 displays the processed intermediate image data on the UI 20 (arrow X38). The processes at the arrow X36 and the arrow X38 are examples of a "preview displaying process". The processed intermediate image data processed by the supporting program 42 in accordance with the execution command is an example of the "processed image data". When the print parameters obtained by the editing APP 43 in the process at the arrow X14 shown in FIG. 3 and the print parameters which the supporting program 42 uses in the editing process at arrow E shown in FIG. 2 are identical, the intermediate image data for displaying a preview which is edited by the supporting program 42 in accordance with the execution command becomes the same as the intermediate image data for printing which is edited by the supporting program 42 in accordance with the execution command from the general-use printing program 41 when executing printing. Therefore, the Editing APP 43 can cause the UI 20 to display a more accurate preview image as compared to a case where a preview image is generated by using a program different from the general-use printing program 41 which processes the intermediate image data when executing printing.

Figure 5:
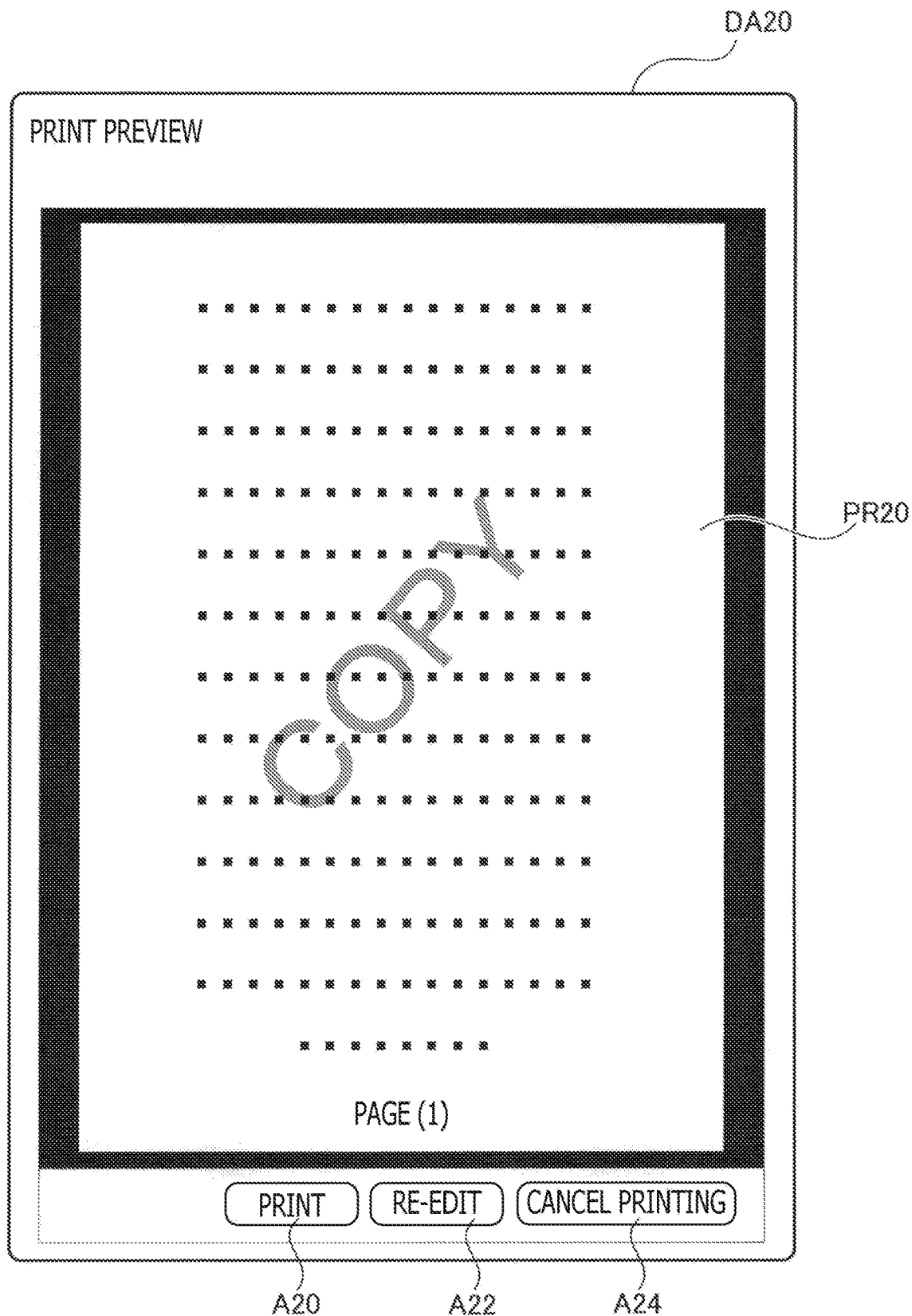
FIG. 5 illustrates an example of a print preview screen.

An example of a print preview screen is shown in FIG. 5. For example, upon receiving processed image data in which a watermark is combined to the image of the intermediate image data in accordance with contents of the settings on the watermark setting screen DA10 shown in FIG. 4 from the supporting program 42, the editing APP 43 causes the UI 20 to display a print preview screen DA20 shown in FIG. 5. In the print preview screen DA20, a preview image PR20, an EXECUTE PRINTING button A20, a RE-EDIT button A22 and a CANCEL PRINTING button A24 are displayed.

The preview image PR 20 is an image indicating an imaginary printed image. As the preview image PR20, for example, an image in which "COPY" being a content to be displayed as a watermark is overlaid in the set font, size, character color and the like and in a state where it is further tilted by "45°" is displayed.

The EXECUTE PRINTING button A20 is a button for receiving an operation instructing to execute printing. The RE-EDIT button A22 is a button for receiving an operation instructing to re-edit the watermark. The CANCEL PRINTING button A24 is a button for receiving an operation instructing to cancel printing. Therefore, the print preview screen DA20 can receive the result of the user's determination, through the direct confirmation of the printed image, on whether the printed image is an intended image or not. It is noted that the EXECUTE PRINTING button A20, the RE-EDIT button A22 and the CANCEL PRINTING button A24 may be displayed in a screen different from the print preview screen DA20. For example, these buttons for receiving the operations for the instructions are displayed on the UI 20 after displaying the print preview screen DA20.

Referring back to FIG. 3, when the EXECUTE PRINTING button A20 is pressed and the print instruction is received (arrow A), the editing APP 43 transmits a main processing request to the supporting program 42 (arrow X42). The main processing request is for requesting to process the intermediate image data for printing. To the main processing request, a flag indicating that the main processing request is not the execution command to execute the editing process of processing the intermediate image data for displaying the preview or a flag indicating that the main processing request is an execution command to execute the editing process of processing the intermediate image data for printing may be attached.

To the main processing request, at least the print parameters including the intrinsic parameters are attached. Since the processes at the arrows X12-X38 are not always executed, the intrinsic parameters are attached to the main processing request to make sure that the intrinsic parameters are delivered from the editing APP 43 to the supporting program 42. On the other hand, since the general-use parameters are transmitted separately from the general-use printing program 41 to the supporting program 42, the general-use parameters need not be attached to the main processing request. Further, the editing APP 43 transmits the main processing request to the supporting program 42 in advance of a print execution notification (arrow B) which will be described later in order to deliver the intrinsic parameters to the supporting program 42 in advance of the execution command from the general-use printing program 41 without fail.

When the EXECUTE PRINTING button A20 is pressed and the print instruction is received, the editing APP 43 attaches, to the main processing request, the print parameters identical to those attached to the processing request in the process at the arrow X32, and delivers the main processing request to the supporting program 42. It is noted that, when the RE-EDIT button A22 is pressed, after receiving inputs to change the print parameters, the editing APP 43 delivers, to the supporting program 42, the main processing request to which the changed print parameters are attached. When the CANCEL PRINTING button A22 is pressed, the editing APP 43 does not execute processes from the arrow A. That is, the editing APP 43 does not deliver the main processing request to the supporting program 42.

The editing APP 43 which has delivered the main processing request to the supporting program 42 transmits the print execution notification to the general-use printing program 41 (arrow B). To the print execution notification, the image data obtained at the arrow X12 is attached. Further, to the print execution notification, among the print parameters obtained at the arrow X14, only the general-use parameters are attached.

In response to receiving the print execution notification, the general-use printing program 41 generates the intermediate image data for printing using the image data and the general-use parameters attached to the print execution notification (arrow C). It is noted that, after the editing APP 43 has displayed the preview by the process at the arrow X38, when the EXECUTE PRINTING button A20 is pressed and the print instruction is received without receiving changes of the print parameters, the format of the intermediate image data for printing generated in the process at the arrow C by the general-use printing program 41 becomes the same as the intermediate image data for displaying the preview generated in the process at the arrow X24. It is noted that transmission of the print execution notification, which causes the general-use printing program to generate the intermediate image data, is an example of a printing requesting process.

After generating the intermediate image data, the general-use printing program 41 transmits, to the supporting program 42, the execution command for causing the supporting program 42 to execute a process of editing the intermediate image data (arrow D). To the execution command, the intermediate image data, generated for printing by the general-use printing program 41 in the process at the arrow C and being of the same format as the intermediate image data for displaying the preview, is attached.

Upon receiving the execution command of the process for editing the intermediate image data through the second interface, the supporting program 42 processes the intermediate image data attached to the execution command based on the intrinsic parameters attached to the main processing request (arrow X44). After the editing APP 43 has displayed the preview by the process at the arrow X38, when the EXECUTE PRINTING button A20 is pressed and the print instruction is received without receiving changes of the print parameters, the supporting program 42 processes the intermediate image data in the same condition as the process at the arrow X34. In this case, at the arrow X44, the intermediate image data is processes such that the intermediate image data indicates the image that the user has directly confirmed.

It is noted that, when, for example, the editing APP 43 causes the supporting program 42 to generate the intermediate image data for displaying the preview, in the process at the arrow X42, the editing APP 43 delivers, to the supporting program 42, the print parameter indicating the quality set by the print parameters obtained in the process at the arrow X14. In this case, the supporting program 42 generates, in the process at the arrow X44, the intermediate image data in the quality indicated by the delivered print parameter.

As described above, upon receiving the end notification indicating that the edition of the intermediate image data is terminated along with the intermediate image data processed by the supporting program 42 (arrow F), the general-use printing program 41 generates the print data (arrow G) and outputs the print command to the printer 2 (arrow H).

Next, a control procedure of a characteristic part of the present print system will be described using FIG. 6. This process is executed in the CPU 11 of the PC 1 response to the PRINT PREVIEW button A14 being pressed and the editing APP 43 receiving a preview display instruction (arrow X16 shown in FIG. 3).

Figure 6:
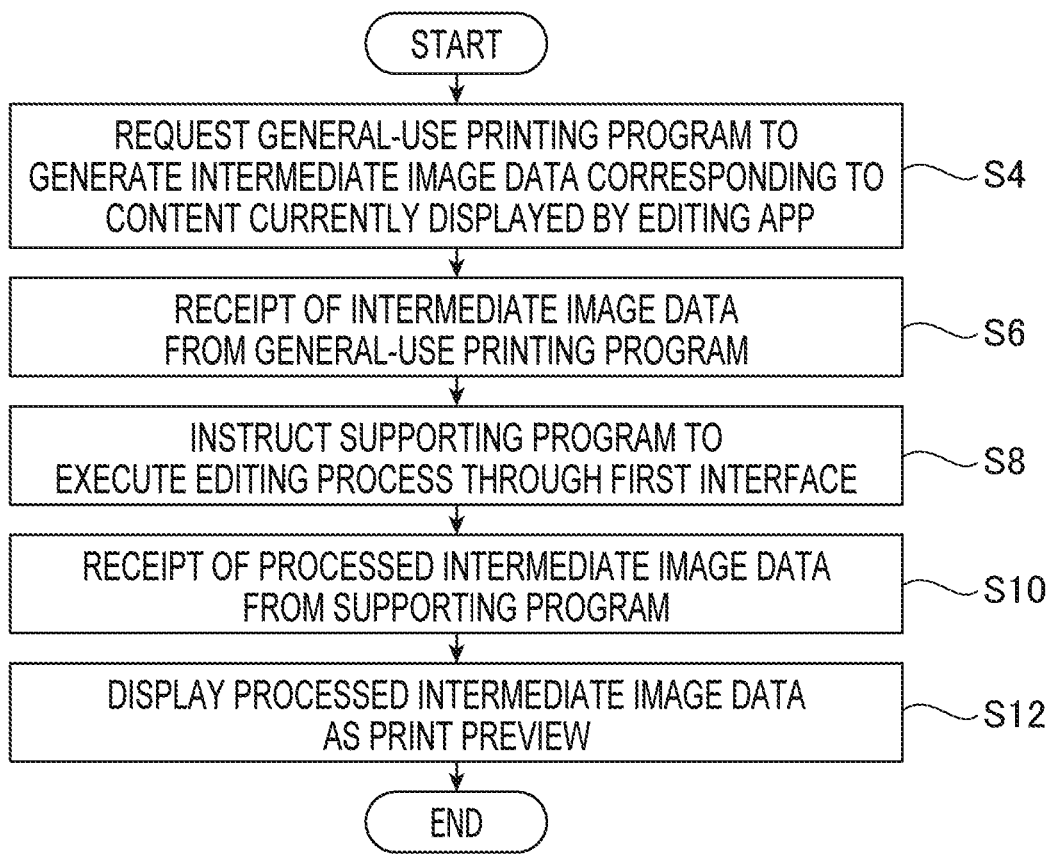
FIG. 6 is a flowchart showing an example of a procedure of processes by the editing application.

As shown in FIG. 6, the CPU 11 requests the general-use printing program 41 to generate intermediate image data corresponding to the content currently displayed by the editing APP 43 (S4). The process at S4 is an example of the process requesting process. For example, when the PRINT PREVIEW button A14 displayed in the watermark setting screen DA10 shown in FIG. 4 is pressed, the editing APP 43 requests the general-use printing program 41 to generate intermediate image data corresponding to the print parameters set in the print setting screen including the watermark setting screen DA 10. The general-use printing program 41 generates the intermediate image data based on identifiable general-use parameters among the print parameters and returns the intermediate image data to the editing APP 43.

Upon receiving the intermediate image data from the general-use printing program 41 (S6), the editing APP 43 causes the supporting program 42 to execute the editing process through the first interface (S8). That is, the editing APP 43 outputs the processing request to execute the editing process to the supporting program 42. In the editing process, the intermediate image data the editing APP 43 obtained from the general-use printing program 41 and the print parameters obtained by the editing APP 43 are used.

Upon receiving the intermediate data edited by the supporting program 42, that is, the processed intermediate image data (S10), the editing APP 43 causes the UI 20 to display the edited intermediate image data (S12) and terminates the process. The process at S12 is an example of the preview displaying process.

As described in detail, the PC 1 which executes the editing APP 43 of the present embodiment inputs, directly from the editing APP 43 to the supporting program 42 which processes an image when executing printing, the execution command to execute the editing process, obtains the intermediate image data output from the supporting program 42 and displays the intermediate image data as a preview. That is, the editing APP 43 causes the supporting program 42 to execute the same processes as in the case where the print instruction is received, obtains a preview image and causes the UI 20 to display the preview image. Therefore, the user can confirm a processed image equivalent to an image to be generated when printing is executed prior to inputting the print instruction to the PC 1 and thus printing of an image to which processes that are not intended by the user are applied can be reduced.

Figure 7A:
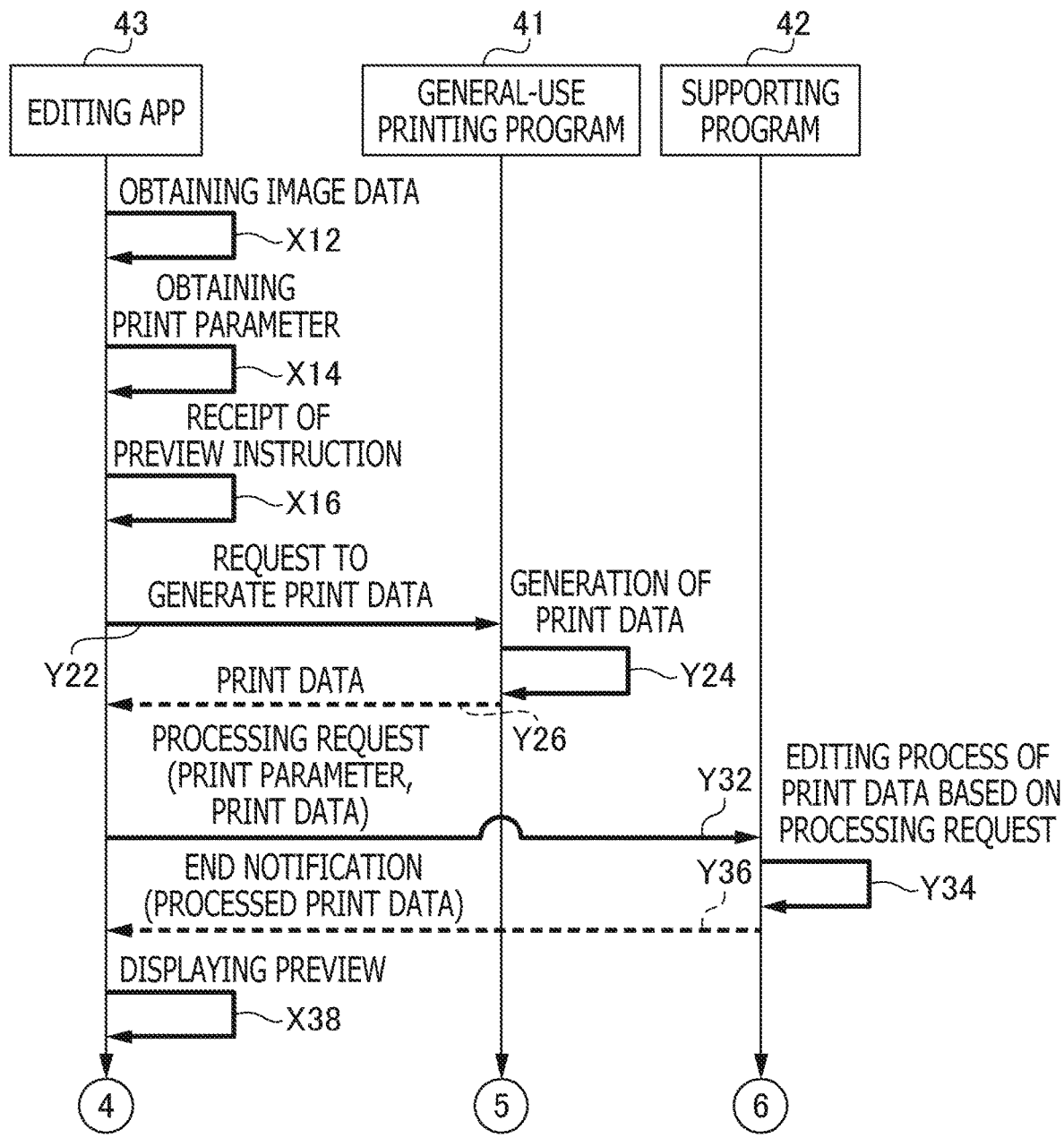
FIGS. 7A and 7B are sequential charts showing a variation of the preview operation realized by the editing application.
Figure 7B:
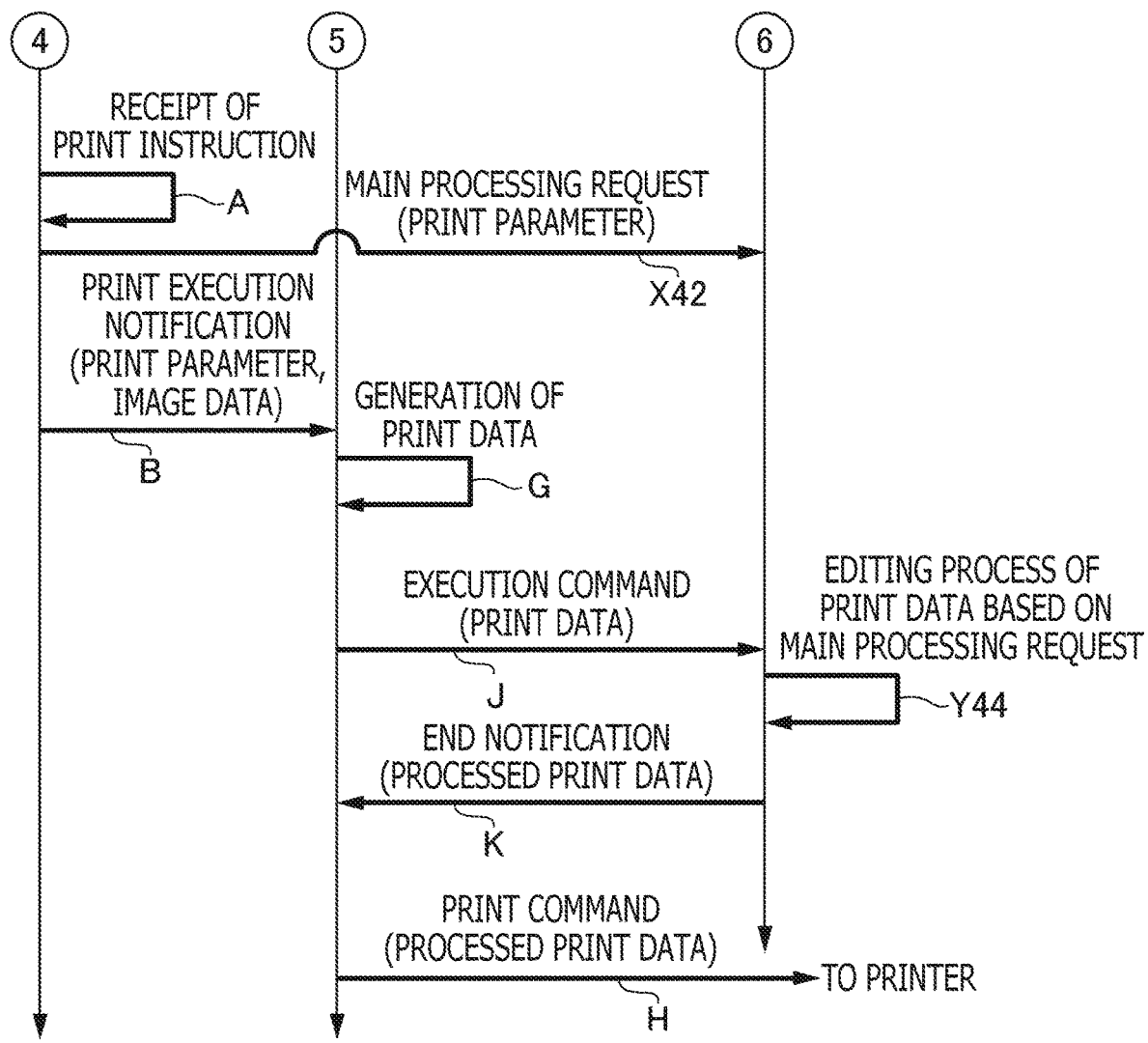

In the above-described example, when the editing APP 43 executes displaying of the preview, the editing APP 43 requests the general-use printing program 41 to generate the intermediate image data and causes the UI 20 to display the processed intermediate image data which is generated by processing the intermediate image data in accordance with the request using the supporting program 42 (See the arrows X22-X38 of FIG. 3.). However, for example, as a sequential chart shown in FIG. 7, the editing APP 43 may be configured to request the general-use printing program 41 to generate the print data (arrow Y22), cause the general-use printing program 41 to generate the print data based on the image data and the general-use parameters which are obtained by the editing APP 43 (arrow Y24), and receive the print data from the general-use printing program 41 (arrow Y26). Thereafter, as with the processes (arrows X34, X36) from the arrow X32 in FIG. 3, the editing APP 43 executes the processes (arrows Y34, Y36) from the arrow Y32. In this case, the editing APP 32 executes the processing request (arrow Y32) using the print data in place of the intermediate image data. Further, the print data generated in the process at the arrow G is attached to the execution command (i.e., the processing request), and processed print data processed at arrow Y44 is attached to the end notification. It is noted that the processed print data is an example of the processed image data.

In the above-described example, when the EXECUTE PRINTING button A20 in the print preview screen DA20 is pressed, the editing APP 43 causes the general-use printing program 41 to execute a normal printing operation. However, for example, as another example shown in FIG. 8, when the EXECUTE PRINTING button A20 in the print preview screen DA20 is pressed and the print execution instruction is received (arrow A), the editing APP 43 may attach the intermediate image data received in the process at the arrow X36 to the print execution notification. In this case, a flag indicating that the attached intermediate image data is already processes is attached to the print execution instruction. Upon receiving the print execution instruction to which the flag is attached, the general-use printing program 41 does not execute the edition of the intermediate image data, generates the print data based on the intermediate image data attached to the print execution instruction (arrow Gy), and transmits the print command including the generated print data to the printer 2 (arrow H). According to this configuration, the general-use printing program 41 can cause the printer 2 to execute printing without causing the supporting program 42 to execute the editing process of the intermediate image data, and thus it is possible to make the control of the print system simpler. It is noted that processes by the editing APP 43 to cause the general-use printing program 41 to generate the intermediate image data (arrow X24) and the print data (arrow Gy) are examples of a data generating process.

Figure 8:
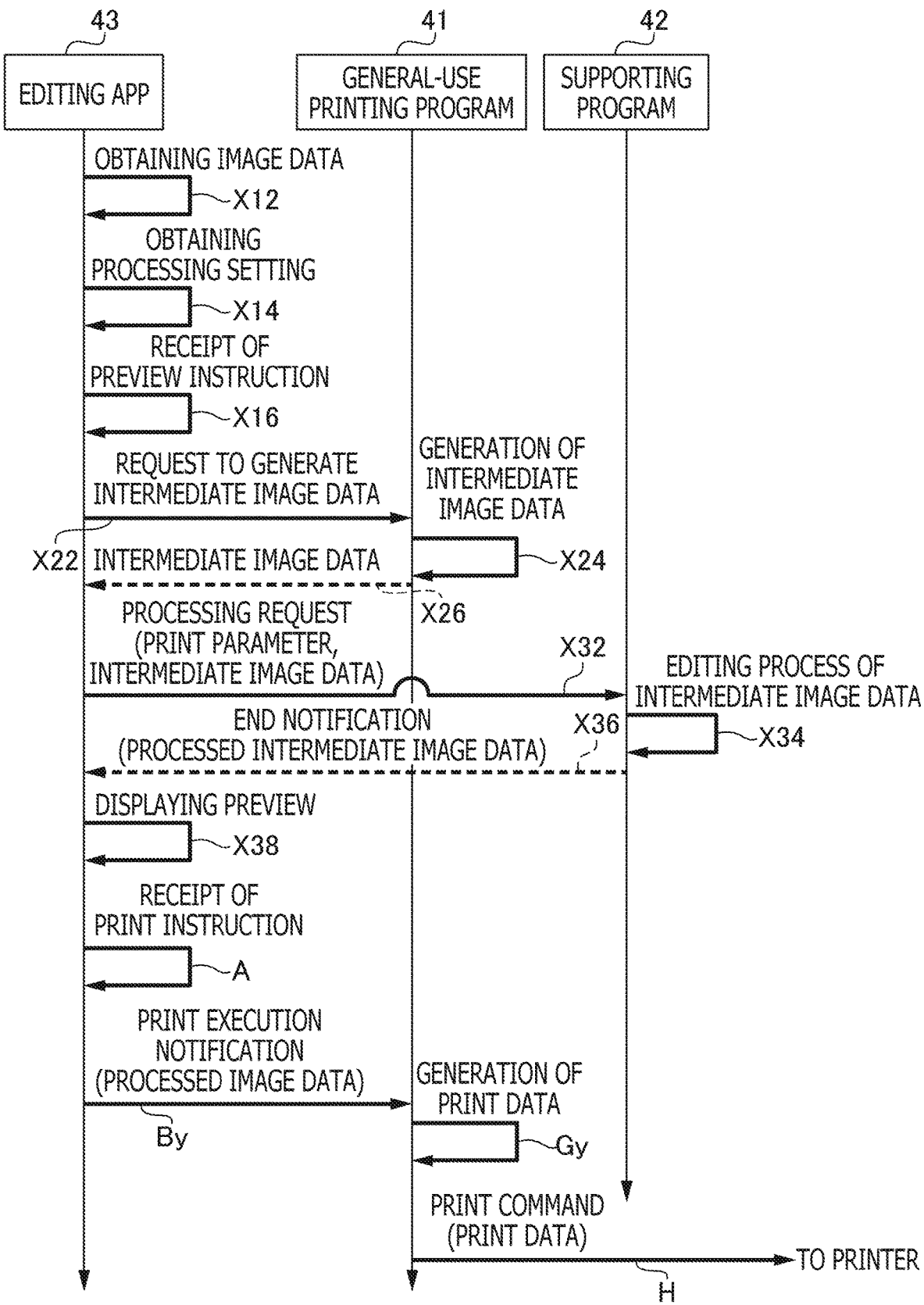
FIG. 8 is a sequential chart showing another example of a preview operation realized by the editing application.

Further, even in the processes shown in FIG. 8, as with the processes shown in FIG. 3, the intermediate image data which is handled in the processes at the arrows X22-X36 may be used as the print data. In this case, in the process at the arrow By, the editing APP 43 attaches the processed print data to the print execution notification. The general-use printing program 41 which received this print execution notification can output the print command to the printer 2 without generating the print data.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

For example, in the embodiment, the editing APP 43 directly obtains the print parameters by the process at the arrow X14. However, after the editing APP 43 has obtained the image data (arrow X12), the editing APP 43 may request the supporting program 42 to obtain the print parameters. That is, the editing APP 43 may cause the supporting program 42 to execute an editing process of the print parameters and may obtain the print parameters from the supporting program 42.

For example, in the embodiment, the editing APP 43 obtains the intermediate image data from the general-use printing program 41 and transmits, to the supporting program 42, the execution command to which the intermediate image data is attached. However, the editing APP 43 may generate the intermediate image data using a program different from the general-use printing program 41 (e.g., by the editing APP 43 itself) and attach the generated intermediate image data to the execution command. However, a more accurate preview can be displayed on the UI 20 if the editing APP 43 obtains, from the general use printing program 41, the intermediate image data generated by the general-use printing program 41 and attaches the obtained intermediate image data to the execution command as in the embodiment.

For example, the supporting program 42 may have a function for the general-use printing program 41 and a function for the editing APP 43 separately. Further, the function for the general-use printing program 41 and the function for the editing APP 43 may be the same function of which parameters for the general-use printing program and parameters for the editing APP 43 are different to each other. Further, the supporting program 42 may be configured to have a class identifying an object for the general-use printing program 41 and a class identifying an object for the editing APP 43 separately. Further, the class identifying the object for the general-use printing program 41 and the class identifying the object for the editing APP 43 may be the same class in which parameters input by the general-use printing program 41 and parameters input by the editing program 43 are different to each other.

For example, in the embodiment, the supporting program 42 includes the first interface for receiving the intermediate image data from the editing APP 43 and the second interface for receiving the intermediate image data from the general-use printing program 41. However, the supporting program 42 may include a first interface for requesting the intermediate image data to be displayed on the UI 20 and a second interface for requesting the intermediate image data to be printed by the printer 2. In this case, when the intermediate image data is received from the editing APP 43 through the first interface, the supporting program 42 may edit the intermediate image data and provide the processed intermediate image data to the editing APP 43, and when the intermediate image data is received from the general-use printing program 41 through the second interface, the supporting program 42 may generate the processed intermediate image data and provide the processed intermediate image data to the general-use printing program 41, and the general-use printing program 41 may execute processes for causing the printer 2 to print an image based on the processed intermediate image data.

A module that executes the print parameter determining process is not limited to the supporting program 42 but may be a program that receives instructions form the OS 21 or the general-use printing program 41 when executing printing using the general-use printing program 41. For example, the module may be a print workflow app (i.e., Print workflow) of which specification is disclosed by Microsoft.

In the embodiment, as operations of the editing APP 43, only the operation for displaying the print preview is described in detail. However, the editing APP 43 may have other roles.

In the embodiment, when the editing APP 43 receives the processing setting through the setting screen in the process at the arrow X14, the setting screen receives both the general-use parameters and the intrinsic parameters. However, only the intrinsic parameters may be set through other means. For example, the intrinsic parameters may be set through a screen the supporting program 42 displays on the UI 20 and may be stored in the storage area for the supporting program 42. In this case, for example, the supporting program 42 may read out the intrinsic parameters from the storage area for the supporting program 42 when executing processes such as the process at the arrow X34 or the process at the arrow X44 and may process the intermediate image data or the print data in accordance with the read out intrinsic parameters. On the contrary, only the general-use parameters may be set through other means.

The editing APP 43 may not attach the general-use parameters to the request for generating the intermediate image data for displaying the preview or the print data (See the processes at the arrows X22 and Y22.), and the general-use printing program 41 may read out the general-use parameters stored in the memory 12 and process the intermediate image data or the print data.

In any of the flowcharts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the information processing apparatus being connected to a printer, the recording medium containing computer-executable instructions realizing an application program configured to output a printing instruction to cause the printer to execute printing, the application program, as executed by the controller, causing the information processing apparatus to:

obtain image data;

when a print instruction to instruct the printer to execute printing an image indicated by the image data is received, the application program causes the information processing apparatus to input, to a general-use printing program, notification indicating that the print instruction is received, the general-use printing program being a program implemented in an operating system of the information processing apparatus, the general-use printing program activating a supporting program when the notification indicating that the print instruction is received;

obtain printing setting used for processing by a processing function of the supporting program corresponding to the printer, the supporting program being a program implemented in the information processing apparatus, the supporting program having a processing function of applying processing to an image;

cause the general-use printing program to output to the application program one of the intermediate image data or the print data based on the image data to the application program when receiving displaying instruction to display an image to be printed by the printer;

input, to the supporting program, a processing request to execute processing based on one of the generated intermediate image data and the generated print data and based on the printing setting, the supporting program generating processed image data by applying processing by the processing function to one of the generated intermediate image data or the generated print data when receiving the processing request; and obtain, from the supporting program, the processed image data generated by the supporting program based on the processing request, and cause a display of the information processing apparatus to display an image indicated by the processed image data, wherein the supporting program generates processed image data by applying the processing using the processing function to one of intermediate image data or print data which are output from the general-use printing program to the supporting program, the general-use printing program causing the printer to execute printing of an image indicated by the processed image data provided from the supporting program.

2. The non-transitory computer-readable recording medium according to claim 1, wherein the intermediate image data is input to the supporting program in association with the processing request.

3. The non-transitory computer-readable recording medium according to claim 2, wherein the supporting program comprises a first interface configured to receive intermediate image data from the application program and a second interface configured to receive intermediate image data from the general-use printing program, wherein the intermediate image data is input through the first interface of the supporting program by the application program, wherein the supporting program is configured to:

when receiving the intermediate image data from the application program through the first interface, generate processed image data by applying processing to an image indicated by the intermediate image data received through the first interface and providing the generated processed image data to the application program; and when receiving the intermediate image data through the second interface from the general-use printing program, generate processes image data by applying processing to an image indicated by the intermediate image data received through the second interface and providing the generated processed image data to the general-use printing program, the general-use printing program, after receiving the processed image data from the supporting program, causes the printer to print an image based on the obtained processed image data.

4. The non-transitory computer-readable recording medium according to claim 2,
wherein the supporting program comprising a first interface configured to request the application program for the intermediate image data to be displayed on the display and a second interface configured to request the general-use printing program for the intermediate image data to be printed by the printer,
wherein the intermediate image data is input through the first interface of the supporting program by the application program,
wherein the supporting program is configured to:
when receiving the intermediate image data from the application program through the first interface, generate processed image data by applying processing to an image indicated by the intermediate image data received through the first interface and providing the generated processed image data to the application program; and
when receiving the intermediate image data through the second interface from the general-use printing program, generate processes image data by applying processing to an image indicated by the intermediate image data received through the second interface and providing the generated processed image data to the general-use printing program, the general-use printing program, after receiving the processed image data from the supporting program, causes the printer to print an image based on the obtained processed image data.

5. The non-transitory computer-readable recording medium according to claim 1,
wherein the application program, as executed by the controller, causes the information processing apparatus to perform, when receiving the printing instruction while displaying the image-as a preview image, outputting, to the general-use printing program, the printing instruction to execute printing based on the image data, the general-use printing program activating the supporting program and causing the supporting program to generate the processed image data when receiving the printing instruction.

6. The non-transitory computer-readable recording medium according to claim 1,
wherein the print data is input to the supporting program in association with the processing request.

7. The non-transitory computer-readable recording medium according to claim 6,
wherein the supporting program comprising a first interface configured to receive print data from the application program and a second interface configured to receive print data from the general-use printing program,
wherein, the print data is input through the first interface of the supporting program by the application program,
wherein the supporting program is configured to:
when receiving the print data from the application program through the first interface, generate, as processed print data, processed image data by applying processing to an image indicated by the print data received through the first interface and providing the generated processed print data to the application program; and
when receiving the print data through the second interface from the general-use printing program, generate processes print data by applying processing to an image indicated by the print data received through the second interface and providing the generated processed print data to the general-use printing program, the general-use printing program, after receiving the processed image data from the supporting program, causes the printer to print an image based on the obtained processed image data.

8. A non-transitory computer-readable recording medium for an information processing apparatus, the information processing apparatus having a controller, the information processing apparatus being connected to a printer, the recording medium containing computer-executable instructions realizing a supporting program corresponding to the printer connected to the information processing apparatus, wherein:
the supporting program has a processing function to apply processing to an image,
the supporting program has a first interface configured to receive intermediate image data from an application program implemented in the information processing apparatus and a second interface configured to receive intermediate image data from general-use printing program implemented in an operating system of the information processing apparatus,
wherein the supporting program, as executed by the controller, causing the information processing apparatus to perform:
when the controller receives the intermediate image data from the application program through the first interface, generating processed image data by applying processing using the processing function to the intermediate image data received through the first interface and providing the generated processed image data to the application program; and
when the controller receives the intermediate image data from the general-use printing program through the second interface, generating processed image data by applying processing using the processing function to the intermediate image data received through the second interface and providing the generated processed image data to the general-use printing program, the general-use printing program causing, after receiving the processed image data from the supporting program, the printer to execute printing of an image indicated by the processed image data provided from the supporting program.

9. A non-transitory computer-readable recording medium for an information processing apparatus, the information processing apparatus having a controller, the information processing apparatus being connected to a printer, the recording medium containing computer-executable instructions realizing a supporting program corresponding to the printer connected to the information processing apparatus, wherein:
the supporting program has a processing function to apply processing to an image,
the supporting program has a first interface configured to request an application program, which is executable by the controller and configured to output a printing instruction to cause the printer connected to the information processing apparatus, for processed image data to be displayed on a display of the information processing apparatus and a second interface configured to request general-use printing program, which is implemented in an operating system of the information processing apparatus, for processed image data to be printed by the printer, wherein the supporting program, as executed by the controller, causing the information processing apparatus to perform:
  when the controller receives intermediate image data from the application program through the first interface, generating the processed image data by applying processing using the processing function to the intermediate image data received through the first interface and providing the generated processed image data to the application program; and
  when the controller receives intermediate image data from the general-use printing program through the second interface, generating the processed image data by applying processing using the processing function to the intermediate image data received through the second interface and providing the generated processed image data to the general-use printing program, the general-use printing program causing, after receiving the processed image data from the supporting program, the printer to execute printing of an image indicated by the processed image data provided from the supporting program.

10. An information processing apparatus having a controller,
wherein an application program configured to output a printing instruction to cause a printer connected to the information processing apparatus to execute printing and a supporting program corresponding to a printer connected to the information processing apparatus are implemented in the information processing apparatus,
wherein an operating system of the information processing apparatus has general-use printing program,
wherein the controller is configured to:
  obtain image data;
  when a print instruction to instruct the printer to execute printing an image indicated by the image data is received, input, to the general-use printing program, notification indicating that the print instruction is received, the general-use printing program activating the supporting program when the notification indicting that the printing instruction is received is inputted, the supporting program having a processing function to process an image,
wherein the controller is further configured to:
  obtain printing setting used for processing by the processing function of the supporting program;
  when receiving displaying instruction to display an image to be printed by the printer from the application program, cause the general-use printing program to output one of an intermediate image data or a print data based on the image data to the application program and input, to the supporting program, a processing request from the application program to execute processing of one of the generated intermediate image data or generated the print data based on the printing setting;
  generate processed image data by activating the supporting program and by applying processing using the processing function to one of the generated intermediate image data or the generated print data,
  deliver the processed image data from the supporting program to the application program and cause a display of the information processing apparatus to display an image indicated by the processed image data; and
  cause the general-use printing program to output one of intermediate image data or print data to the supporting printer,
wherein the supporting program generates processed image data by applying the processing using the processing function to one of the intermediate image data or the print data which are output from the general-use printing program, the controller causing the general-use printing program to cause the printer to execute printing of an image indicated by the processed image data provided from the supporting program.

11. A printing method to cause a printer to execute printing based on print data generated by an information processing apparatus, the printer being connected to the information processing apparatus, an application program configured to output a printing instruction to cause the printer to execute printing and a supporting program corresponding to the printer being implemented in the information processing apparatus, an operating system of the information processing apparatus having a general-use printing program which is implemented in the operating system,
wherein the printing method includes:
  obtaining image data;
  when a print instruction to instruct the printer to execute printing an image indicated by the obtained image data is received, inputting, to the general-use printing program, notification indicating that the print instruction is received, the general-use printing program activating the supporting program when the notification indicating that the printing instruction is received is inputted, the supporting program having a processing function to process an image,
  obtaining printing setting used for processing by the processing function of the supporting program;
  when receiving displaying instruction to display an image to be printed by the printer:
  causing the general-use printing program to output one of an intermediate image data or a print data based on the obtained image data to the application program and inputting, to the supporting program, a processing request from the application program to execute processing of one of the generated intermediate image data or the generated print data based on the printing setting;
  generating processed image data by activating the supporting program and by applying processing using the processing function to one of the generated intermediate image data or the generated print data; and
  delivering the processed image data from the supporting program to the application program and causing a display of the information processing apparatus to display an image indicated by the processed image data
wherein the supporting program generates processed image data by applying the processing using the processing function to one of intermediate image data or print data which are output from the general-use printing program, where the general-use printing program causes the printer to execute printing of an image indicated by the processed image data provided from the supporting program.

* * * * *